(12) United States Patent
Bartlett et al.

(10) Patent No.: US 7,139,334 B2
(45) Date of Patent: Nov. 21, 2006

(54) COOPERATIVE CODE-ENHANCED MULTI-USER COMMUNICATIONS SYSTEM

(76) Inventors: Alan M. Bartlett, 4 Heritage Dr., Merrimack, NH (US) 03054-3026; Alan Chan, 7 Bowers Landing Dr., Apt. 109, Merrimack, NH (US) 03054

( * ) Notice: Subject to any disclaimer, the term of this patent is extended or adjusted under 35 U.S.C. 154(b) by 943 days.

(21) Appl. No.: 10/175,693

(22) Filed: Jun. 20, 2002

(65) Prior Publication Data

US 2003/0026357 A1 Feb. 6, 2003

Related U.S. Application Data

(60) Provisional application No. 60/299,934, filed on Jun. 21, 2001.

(51) Int. Cl.
*H04L 27/14* (2006.01)
*H04L 27/22* (2006.01)

(52) U.S. Cl. ........................ 375/324; 375/323; 375/341

(58) Field of Classification Search ................ 375/324, 375/326, 341, 261, 298, 281; 329/304
See application file for complete search history.

(56) References Cited

U.S. PATENT DOCUMENTS

| | | | | |
|---|---|---|---|---|
| 5,222,077 A | * | 6/1993 | Krishnan | 375/261 |
| 5,311,547 A | * | 5/1994 | Wei | 375/290 |
| 5,790,606 A | | 8/1998 | Dent | 375/348 |
| 5,917,852 A | | 6/1999 | Butterfield et al. | 375/200 |
| 5,966,412 A | * | 10/1999 | Ramaswamy | 375/341 |
| 5,982,813 A | | 11/1999 | Dutta et al. | 375/219 |
| 6,078,626 A | | 6/2000 | Ramesh | 375/262 |
| 6,122,269 A | | 9/2000 | Wales | 370/338 |
| 6,198,775 B1 | | 3/2001 | Khayrallah et al. | 375/265 |
| 6,215,778 B1 | * | 4/2001 | Lomp et al. | 370/335 |
| 6,219,341 B1 | | 4/2001 | Varanasi | 370/252 |
| 6,343,210 B1 | | 1/2002 | Emmons, Jr. et al. | 455/226.3 |
| 6,393,075 B1 | | 5/2002 | Xu | 375/341 |
| 6,934,317 B1 | * | 8/2005 | Dent | 375/140 |

* cited by examiner

*Primary Examiner*—Mohammed Ghayour
*Assistant Examiner*—Qutub Ghulamali
(74) *Attorney, Agent, or Firm*—John H. Pearson, Jr., Esq.; Walter F. Dawson, Esq.; Pearson & Pearson, LLP

(57) ABSTRACT

A cooperative code-enhanced multiuser communications system having a receiver for resolving user ambiguity in a received composite signal by using convolutional encoder state machine properties to analyze strings of bit sums and separate out individual user data. The receiver comprises a signal sampler which converts a received composite signal to a digital data. A single point cluster mapper determines a closest pseudo-constellation point, and the pseudo-constellation point is formed with the aid of power and timing control in the transmitters. A bit sum look-up table maps symbol points to bit sums. A deterministic loop tests for bit sum cases where symbols can be determined immediately. A guess loop tests the bit sum after the deterministic loop test and performs guesses until all bits are decided. The bit sum is provided to a multiuser convolutional decoder to decide all user data streams.

20 Claims, 7 Drawing Sheets

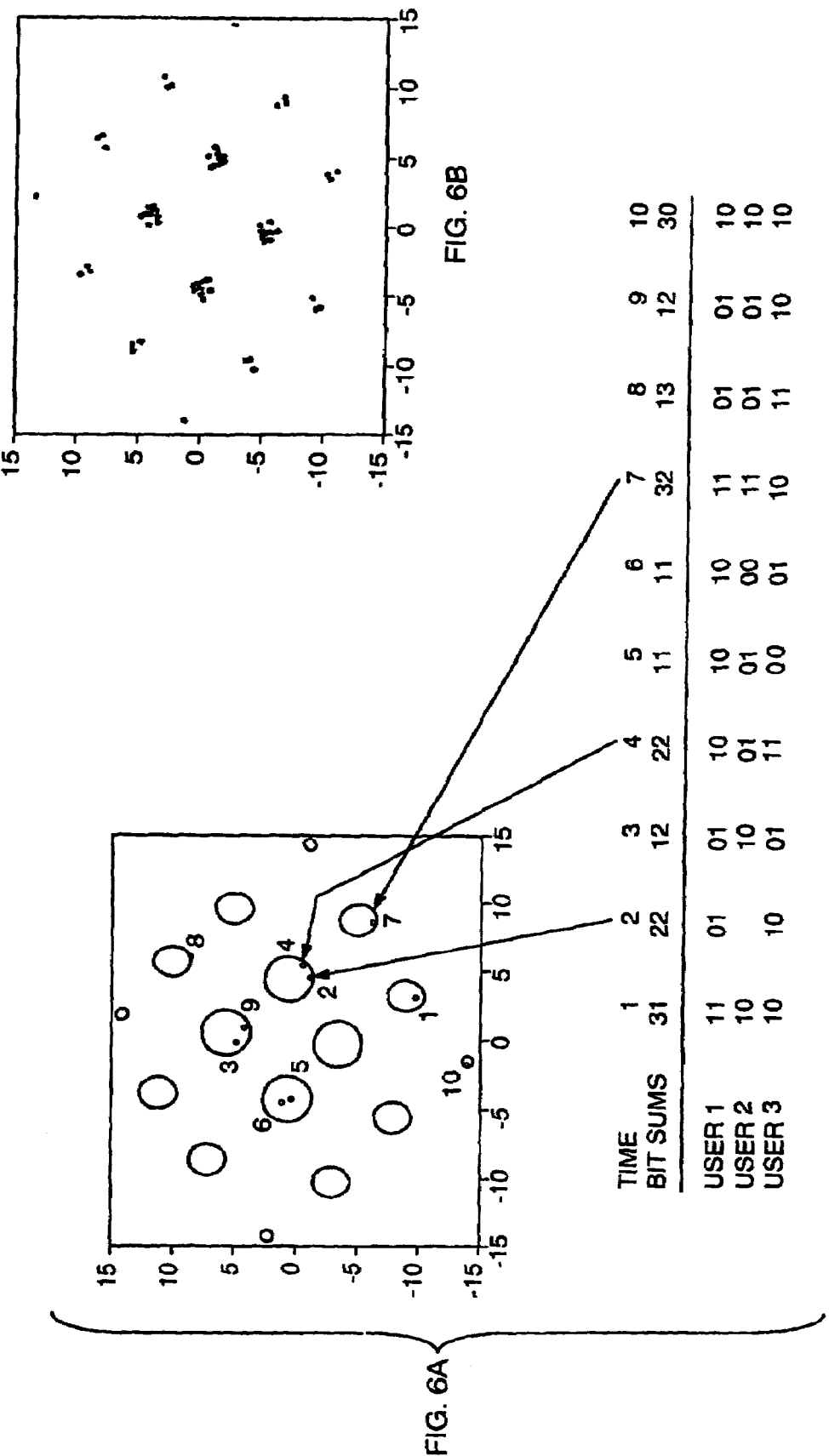

COOPERATIVE CODE-ENHANCED MULTI-USER COMMUNICATIONS SYSTEM

This is a nonprovisional patent application claiming priority of provisional patent application Serial No. 60/299,934, filed Jun. 21, 2001.

BACKGROUND OF THE INVENTION

1. Field of the Invention

This invention relates to a communication system having a plurality of transmitters sending signals that share frequency and bandwidth over a common channel to a single receiver, and in particular to a receiver that resolves user ambiguity in a received composite signal by using convolutional encoding properties to analyze strings of bit sums and separate out individual user data.

2. Description of Related Art

Communication systems having a plurality of transmitters and a common receiver comprising a multiuser detector are computationally intensive. A means for reducing the number of computations required is necessary for creating an economically variable system for resolving the information transmitted by the multiple users over the same channel. The prior art of multiple access schemes in well known to those skilled in the art. For example, in Frequency Division Multiple Access (FDMA), each user's transmitter has a distinct band of frequency and the users do not overlap in frequency. In Time Division Multiple Access (TDMA), every user gets a specific time slot within the same slice of the frequency spectrum. In Code Division Multiple Access (CDMA) multiple user signals share the same portion of a frequency spectrum utilizing varying slices of the spectrum at different time intervals. There is an ever increasing need to increase the number of users and data rate transmissions in a reliable, economical manner.

U.S. Pat. No. 5,790,606 issued Aug. 4, 1998 to Paul W. Dent and assigned to Ericsson Inc., of North Carolina discloses a type of modulation using multiple spatially distributed antennas and recombines that data of a receiver for post-processing. A modified Viterbi (maximum likelihood) antenna is used to decode the bits from the multiple users and multiple antennas. The operation of this system is questionable when bit transitions of the various co-channel transmitters are not aligned in time at every antenna (a virtual impossible condition to meet). Also, this system is very complex and can be very large depending on the space required for the multiple antennas.

U.S. Pat. No. 5,917,852 issued Jun. 29, 1999 to Lee A. Butterfield et al. and assigned to L-3 Communications Corporation of New York, N.Y. discloses a method and apparatus of using independently scrambled Code Division Multiple Access (CDMA) signals to reduce the multi-user interference between the different radios in the system. However, the scrambling occurs outside the actual error correction encoding process and adds additional complexity to the signal.

U.S. Pat. No. 6,122,269, issued to Wales on Sep. 19, 2000 performs multiuser detection and parameter estimation for a packet radio application. This procedure uses MUD to jointly demodulate packets which have unintentionally collided in time. The procedure uses known symbol sequences to solve for the unknown channel impulse response coefficients, and a correlation process to locate the positions of the known symbol sequences. In the case of short "snapshots" (vectors of received waveform samples), the correlation process will produce noisy data, and inaccurate known symbol sequence position estimates. In addition, the waveforms correlated against do not include the (unknown) channel impulse response, and will therefore also be adversely affected by leaving those out of the correlation equation. In addition, there is no mention of method to determine the number of users which are colliding at any given time, and which users are colliding (as identified by their unique known symbol sequences).

SUMMARY OF THE INVENTION

Accordingly, it is an object of this invention to provide a cooperative code-enhanced multi-user detection receiver in a multi-user communications system.

It is another object of this invention to provide a receiver that resolves ambiguity in a received composite signal waveform by using convolutional encoders state machine properties to analyze strings of bit sums and separate out individual user data.

It is a further object of this invention to allow multiple users to use the same slice of a frequency spectrum simultaneously, thereby increasing the data rate using a given portion of the frequency spectrum.

It is another object of this invention to reduce the computational complexity of detecting and decoding the received composite signal by using power and timing control to form a pseudo-constellation of bit sums, and using these bit sums to resolve individual data streams transmitted by multiple users.

These and other objects are accomplished by a receiver of a code-enhanced multiuser communications system comprising a signal sampler for converting a received composite waveform signal to a digitized composite signal, a signal point to cluster mapper, coupled to the digitized composite signal, for calculating a closest pseudo-constellation point of the digitized composite signal and mapping the point to a specific phase and amplitude on a constellation diagram, a bit sum look-up table for receiving the closest pseudo-constellation point and generating a composite symbol bit sum, and a multiuser convolutional decoder for decoding the composite symbol bit sum to generate individual user data streams. The received composite waveform signal comprises encoded signals, each of the encoded signals being generated by a convolutional encoder using a different generator polynomial in each convolutional encoder. The signal point to cluster mapper comprises means for calculating a received signal point in response to receiving the digitized composite signal, a multiuser pseudo-constellation calculator having prestored known user data for determining a multiuser pseudo-constellation to compare to the signal point, and a constellation mapper, coupled to the signal point calculating means for mapping the signal point to the multiuser constellation clusters and selecting the closest pseudo-constellation point. The received signal point calculating means comprises a QAM demodulator. The bit sum look-up table is determined, by the pseudo-constellation calculator prior to processing, for a known number of users in accordance with the prestored known user data. The convolutional decoder comprises a deterministic loop for testing the bit sum, received from the bit sum lookup table by state machine means for determining bits of the bit sum that are not ambiguous, and a guess loop for testing the bit sum after the deterministic loop test and performing guesses until all bits have been decided for each user. The receiver comprises means for determining the bit sum look-up table prior to processing of the received composite waveform signal in accordance with received known user data for each of the users in the system. The composite symbol bit sum is determined by means for summing the bits of individual user symbols. The received composite waveform comprises signals of multiusers operating in a same frequency band of a frequency spectrum.

The objects are further accomplished by a code-enhanced multiuser communication system comprising means for transmitting at least two user channel interfering signals within a predetermined frequency band of a frequency spectrum, a receiver having means for receiving a composite waveform signal from the transmitting means, the receiver further comprises means for converting the received composite waveform signal to composite digital data, means, coupled to the converting means, for calculating a closest pseudo-constellation point of the digitized composite waveform signal and mapping the point to a specific phase and amplitude on a constellation diagram, a bit sum look-up table for receiving the closest pseudo-constellation point and generating a composite symbol bit sum, and a multiuser convolutional decoder for decoding the composite symbol bit sum to generate individual user data streams. The transmitting means for each user comprises a convolutional encoder having a different generator polynomial for each of the transmitting means. The pseudo-constellation point calculating means comprises means for calculating a received signal point in response to receiving the digitized composite signal, a multiuser pseudo-constellation calculator having prestored known user data for determining a multiuser pseudo-constellation to compare to the signal point, and a constellation mapper, coupled to the signal point calculating means for mapping the signal point to the multiuser constellation clusters and selecting the closest pseudo-constellation point. The bit sum look-up table is determined by the pseudo-constellation calculator prior to processing for a known number of users in accordance with the prestored known user data. The convolutional decoder comprises a deterministic loop for testing the bit sum received from the bit sum lookup table by state machine means for determining bits of the bit sum that are not ambiguous, and a guess loop for testing the bit sum after the deterministic loop test and performing guesses until all bits have been decided for each user. The receiver comprises means for determining the bit sum look-up table prior to processing of the received composite waveform signal in accordance with received known user data for each of the users in the system. The receiver comprises means for providing power and timing control to form the pseudo-constellation of bit-sums. The received composite waveform comprises signals of multiusers operating in a same frequency band of a frequency spectrum.

The objects are further accomplished by a method of providing a code-enhanced multiuser communication system comprising the steps of transmitting at least two user channel interfering signals within a predetermined frequency band of a frequency spectrum with means including a convolutional encoder means having a different generator polynomial for each user, receiving a composite waveform signal from the transmitting means with a multiuser detector received, converting in the receiver the received composite waveform signal to composite digitized data in a signal sampler, calculating in the receiver a closest pseudo-constellation point of the composite digitized from the signal sampler and mapping the point to a specific phase and amplitude on a constellation diagram, generating in the receiver a composite symbol bit sum of the closest pseudo constellation point in a bit sum look-up table, and decoding the composite symbol bit sum to generate individual user data streams using a multiuser convolutional decoder. The step of calculating in the receiver a closest pseudo-constellation point of the composite digital data comprises the steps of calculating in a QAM demodulator a received signal point in response to receiving the composite digitized data, calculating in a multiuser pseudo-constellation calculator, having prestored known user data, a multiuser pseudo-constellation to compare to the signal point, and mapping the signal point to clusters of the multiuser constellation in a constellation mapper means and selecting the closest pseudo-constellation point. The method further comprises the step of determining the bit sum look-up table in the multiuser pseudo-constellation calculator, prior to processing, for a known number of users in accordance with the prestored known user data. The step of decoding the composite symbol bit sum comprises the steps of testing in a deterministic loop the bit sum received from the bit sum look-up table by means of a state machine for determining bits of the bit sum that are not ambiguous, and testing in a guess loop the bit sum after the deterministic loop testing and performing guesses until all bits have been decided for each user. The method comprises the step of providing power and timing control in the transmitting means to enable formation of the pseudo-constellation of bit sums.

The method provides for the received composite waveform having signals of multiusers to operate in a same frequency band of a frequency spectrum.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 6A and FIG. 6B show constellation diagrams for illustrating an example of the Multiuser Convolutional Decoder decoding a bit-sum stream.

DESCRIPTION OF ILLUSTRATIVE EMBODIMENTS

Figure 1:
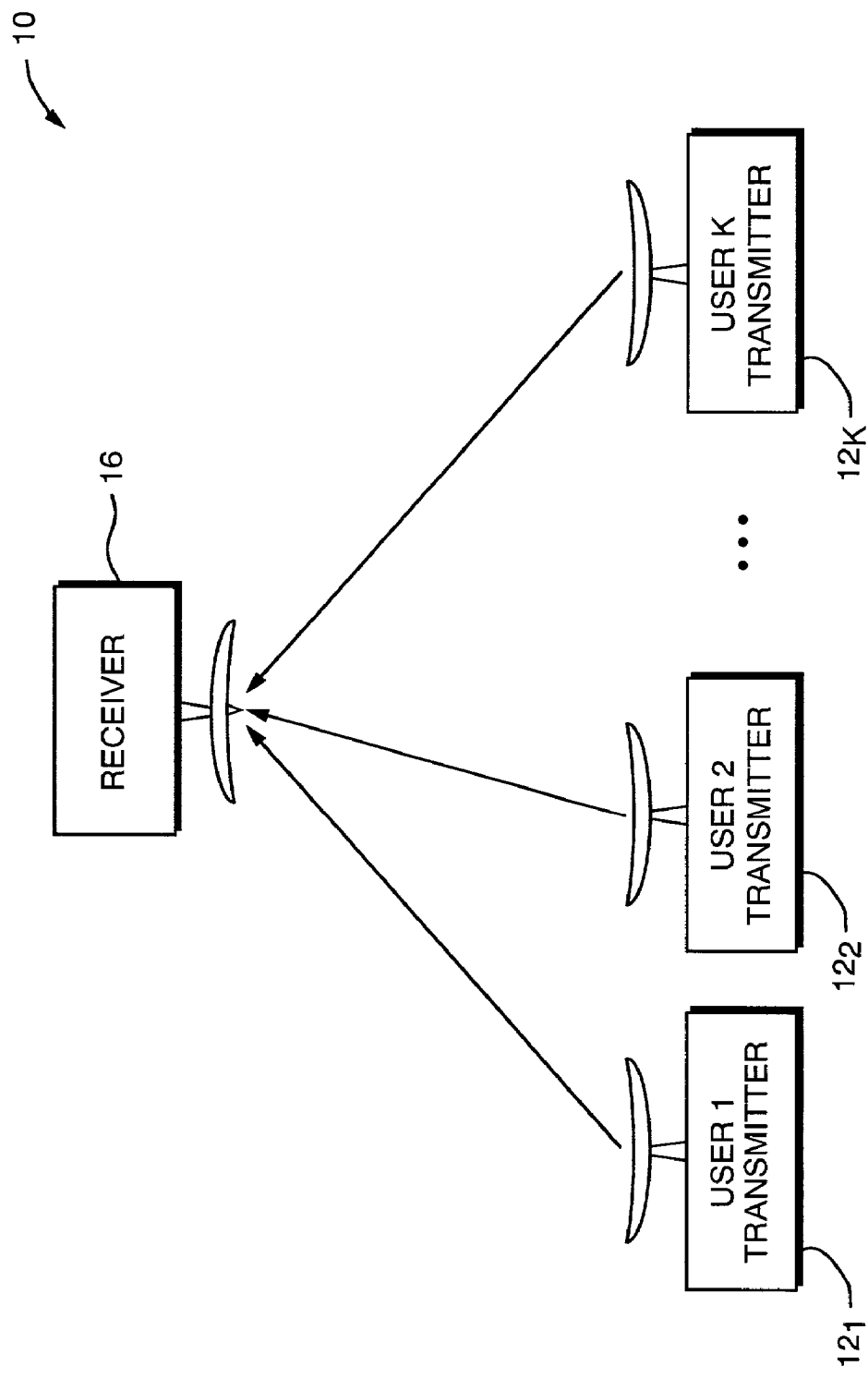
FIG. 1 is a system block diagram of a Cooperative Code-Enhanced Multiuser Communications System.

Referring to FIG. 1, a system block diagram is shown of a Cooperative Code-Enhanced (CCE) Multiuser Communications System 10 comprising two or more User Transmitters $12_1$ to $12_K$ and a common Receiver 16. In the CCE Multiuser Communication System 10 two or more users utilize the same carrier frequency, bandwidth, symbol rate, code rate, constraint length and modulation scheme. Further, each user utilizes a different generator polynomial for its Convolutional Encoder $15_1$ to $15_k$ such that two encoders do not have to share exactly the same state transition information and that the generator polynomials do not cause catastrophic codes. The CCE Multiuser Communications System 10 allows different users to occupy the same frequency spectrum simultaneously, thereby effectively increasing the bandwidth by a factor equal to the number of users or Active Transmitters $12_1$ to $12_K$.

The multiple User Transmitters $12_1$ to $12_K$ send signals over a common channel to the common Receiver 16. Because the signals share frequency and bandwidth, they interfere, resulting in a single composite signal, R. The Receiver 16 resolves the user ambiguity inherent in the received composite signal (R) by using convolutional encoding properties to enhance the detection and decoding of the bits, to analyze strings of bit-sums, and to separate out individual user data.

Figure 2:
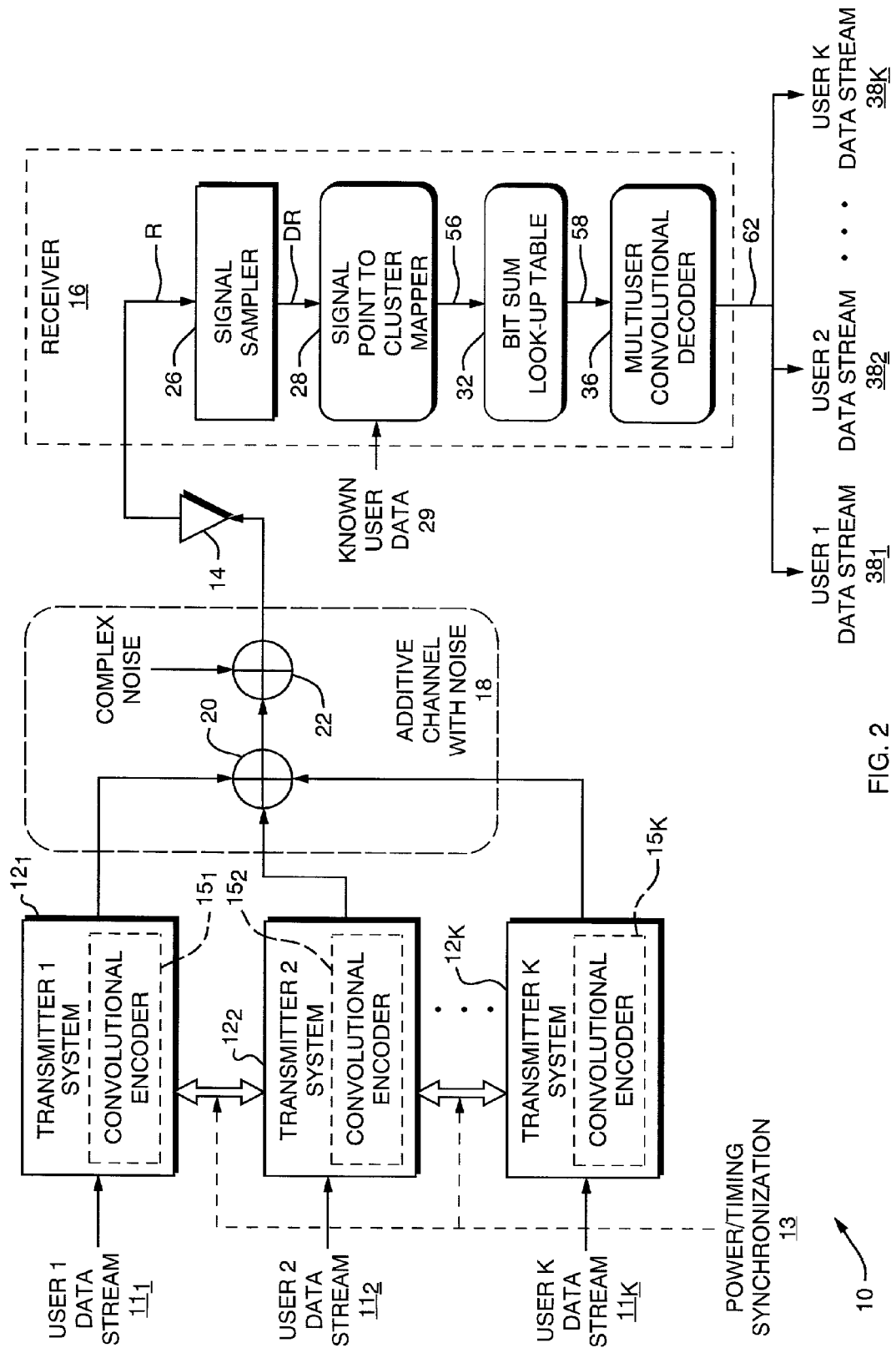
FIG. 2 is a functional block diagram of the Cooperative Code-Enhanced Multiuser Communication System.

Referring now to FIG. 2, a functional block diagram is shown of the CCE Multiuser Communications System 10 comprising the User Transmitters $12_1$ to $12_K$, a Communication Channel with noise 18 and the Receiver 16. Each User Transmitter $12_1$ to $12_K$ synchronizes power and timing with all other User Transmitters $12_1$ to $12_K$ over a control channel(s), prior to sending the signals to be transmitted through an additive channel 18 where a complex noise is injected. The synchronization and additive channel (which are well known in the art) are necessary to ensure a coherent composite signal is received at the Receiver 16, and to separate out individual user data.

Each of the User Transmitters $12_1$ to $12_K$ receive a User Data Stream $11_1$ to $11_K$ and each of the User Transmitters $12_1$ to $12_K$ include a Convolutional Encoder $15_1$ to $15_k$ a modulator in order to transmit encoded modulated signal data via the Communication Channel 18. The term "channel" is used herein to include not only the propagation channel and antenna effects, but also any filtering used in the Transmitters $12_1$ to $12_K$ and Receiver 16 front end. Because the transmitted signals share frequency and bandwidth, they interfere, resulting in a single composite signal (R). Each user is configured with a different generator polynomial to encode their data streams. Each user also follows a power and timing synchronizing scheme 13 which may be implemented using schemes currently available in the art as those employed by international communication specification, IS-95. Cooperation of the power and timing control between all the user Transmitters $12_1$ to $12_k$ is important along with code-enhancement in the Receiver 16.

Antenna 14 receives the composite signal and feeds it to the Receiver 16 which resolves user ambiguity inherent in the composite signal by using convolutional encoding properties to analyze strings of bit-sums and to separate out individual user data.

Figures 4A, 4B:
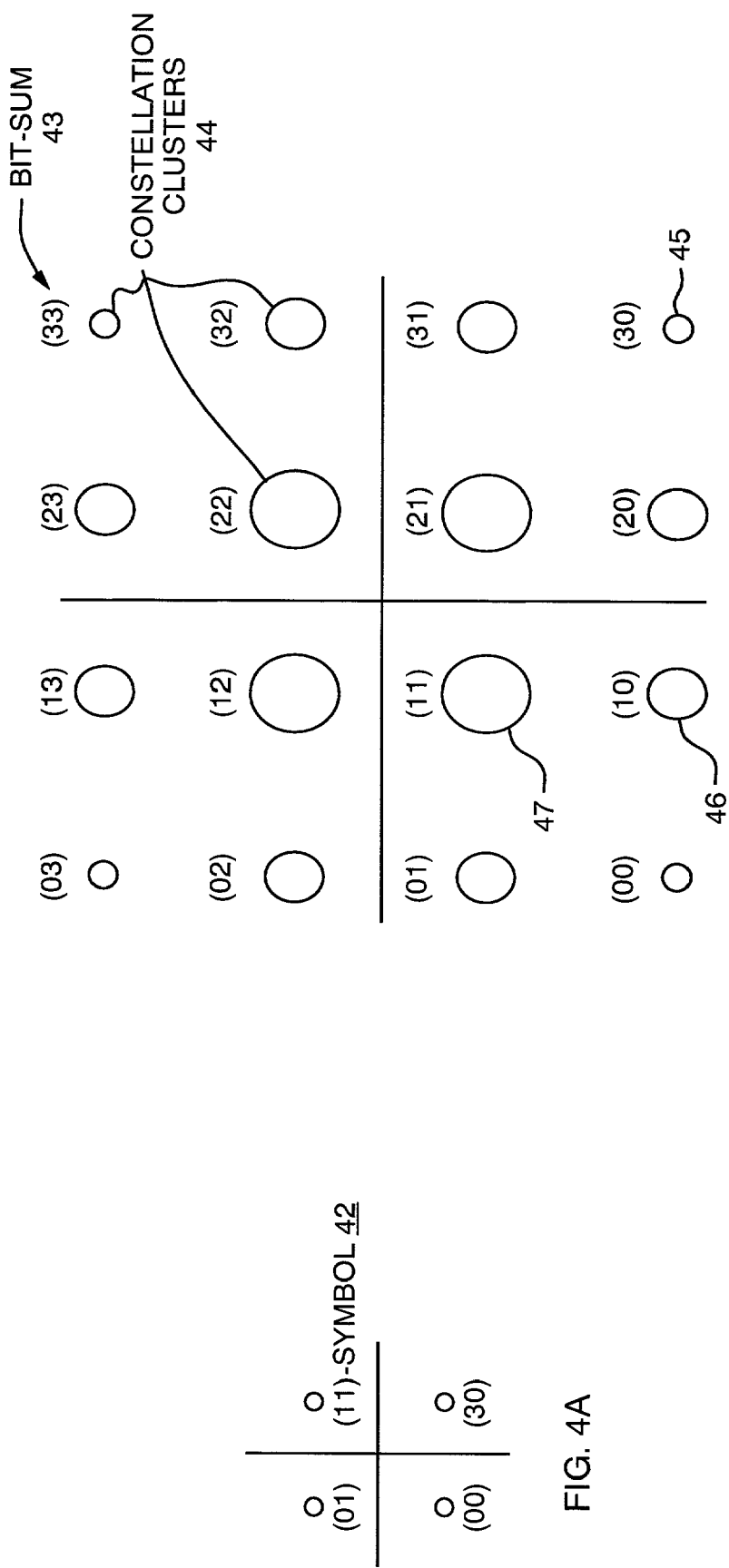
FIG. 4A is a phasor diagram of a typical single user QPSK symbol scheme.
FIG. 4B is a diagram of bit-sums for a Three User Pseudo-Constellation showing various size clusters.

The Receiver 16 comprises a Signal Sampler 26, a Signal Point to Cluster Mapper 28, Bit Sum Look-Up Table 32, and a Multiuser Convolutional Decoder 36. The Signal Sampler 26 converts the composite signal (R) to digital data (DR) which is fed to the Signal Point to Cluster Mapper 28 which is a Quadrature Amplitude Modulation (QAM)-like detector that maps phase and amplitude to a corresponding constellation cluster 44 (FIG. 4B). Clusters 44 are groups of points that represent a common bit-sum value.

Figure 3:
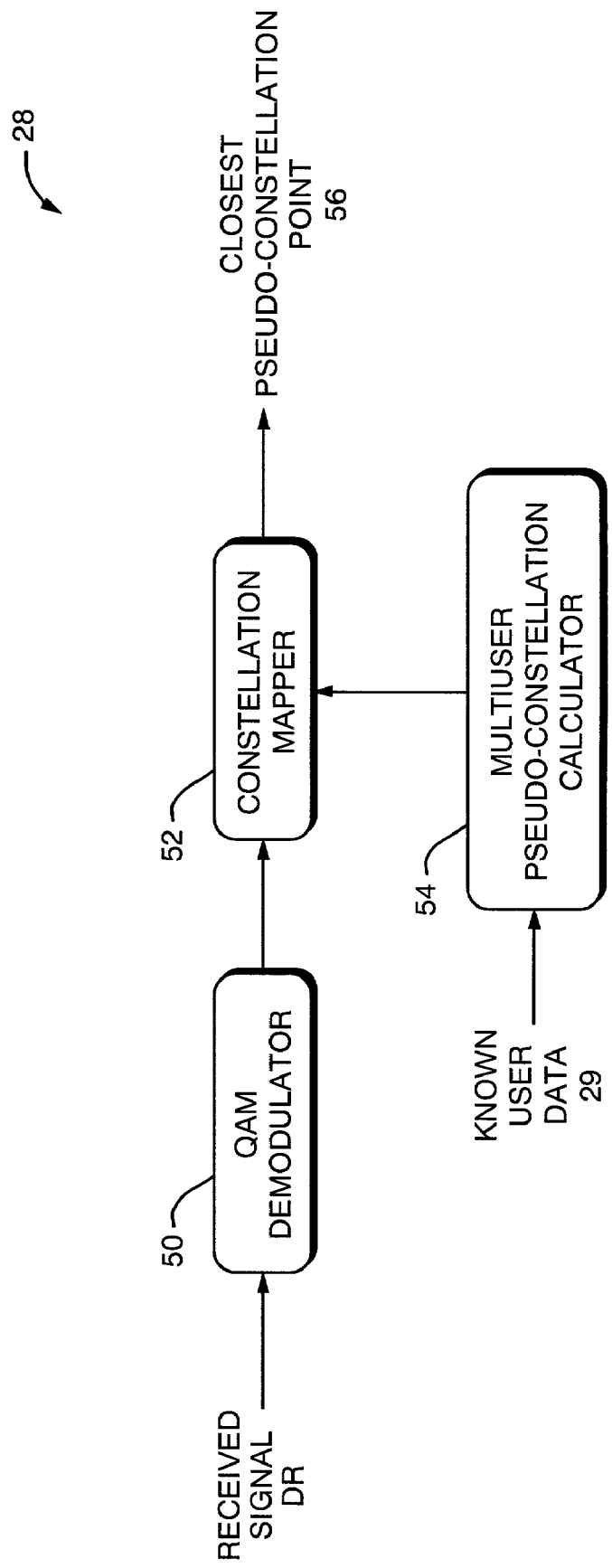
FIG. 3 is a block diagram of a Signal Point To Cluster Mapper.

Referring to FIG. 2 and FIG. 3, FIG. 3 is a block diagram of the Signal Point to Cluster Mapper 28 comprising a QAM Demodulator 50 coupled to a Constellation Mapper 52. The QAM Demodulator 50 calculates the received digital signal point. The Constellation Mapper 52 receives a Multiuser Pseudo-Constellation from a Multiuser Pseudo-Constellation Calculator 54. The calculated signal point from the QAM Demodulator 50 is compared to the Multiuser Pseudo-Constellation, and then a closest point is selected. The output of the Constellation Mapper 52 is a closest pseudo-constellation point identification that results from the mapping of the sampled waveform (DR). This closest pseudo-constellation point 56 is then passed to a Bit-Sum Look-Up Table 32.

Referring to FIG. 2, FIG. 4A, and FIG. 4B, FIG. 4A is a phasor diagram of a typical single user QPSK symbol scheme, and FIG. 4B is a diagram of bit sums for a three user pseudo-constellation showing various size clusters 44. The cooperative power and timing control between all user Transmitters $12_1$ to $12_k$ allows for the proper forming of the pseudo constellation clusters 44 as a result of the timing of the Transmitters $12_1$ to $12_k$ being tightly synchronized, and each users' received power at the Receiver 16 being maintained to be approximately the same as the other users. The output of the Bit Sum Look-Up Table 32 is a bit sum which represents a composite symbol formed by combining the individual user symbols. The Bit Sum Look-Up Table 32 maps constellation symbol points to bit sums. Bit sums are defined as the sum of the bits in each individual user's symbols at one symbol period. The Bit Sum Look-Up Table 32 is calculated by the Multiuser Pseudo-Constellation Calculator 54 prior to processing when Known User Data 29 is received and stored for a known number of users in the system as shown in FIG. 4B using the known single-user constellations as shown in FIG. 4A. The bit sum locations are deterministic. The bit sum pattern in the three user case is given in FIG. 4B. In this example shown in FIG. 4A and FIG. 4B, the most positive constellation point occurs when all users transmit the QPSK symbol 1+j. The most negative constellation point occurs when all users transmit the QPSK symbols −1−j. All the symbol points in between correspond to all combinations of symbols that may be transmitted by all users at any point in the transmission. In the preferred embodiment, the entire received waveform is converted to the users corresponding bit sum and then passed on to the Multiuser Convolutional Decoder 36 for decode pre-processing.

Referring to FIGS. 3, 4A and 4B, the bit sum output 58 is provided to the Deterministic Loop 64 of the Multiuser Convolutional Decoder 36 which checks for bit sum cases where symbols can be determined immediately and any deterministic cases are resolved into individual user symbols. The size of the circles representing clusters 44 in FIG. 4B is proportional to the possible numbers of combinations of symbols from each of the users. The bit sums 43 located at the corners of FIG. 4B represent deterministic cases. In a deterministic case 45 all users transmitted '10' symbol <10+10+10=30> are the symbols and their associated users are known. In a partially deterministic case 46, one user transmitted a '10' symbol and two users transmitted '00' symbol <10+00+00=10>. In this case, the symbols are known, but the user transmitting each symbols is not known; hence, additional processing is needed to match symbols to users. In a non-deterministic case 47, the symbols transmitted and their users are unknown, therefore, this case requires additional processing to determine the symbols and to match such symbols to users. The Multi-User Convolutional Decoder 36 performs the additional processing. Deterministic case bits are filled-in prior to the Multiuser Convolutional Decoding 36 operation. The Multiuser Convolutional Decoder 36 (includes a Guess Loop 66 in FIG. 5), and uses these filled-in bits to aid in processing (guessing).

Figure 5:
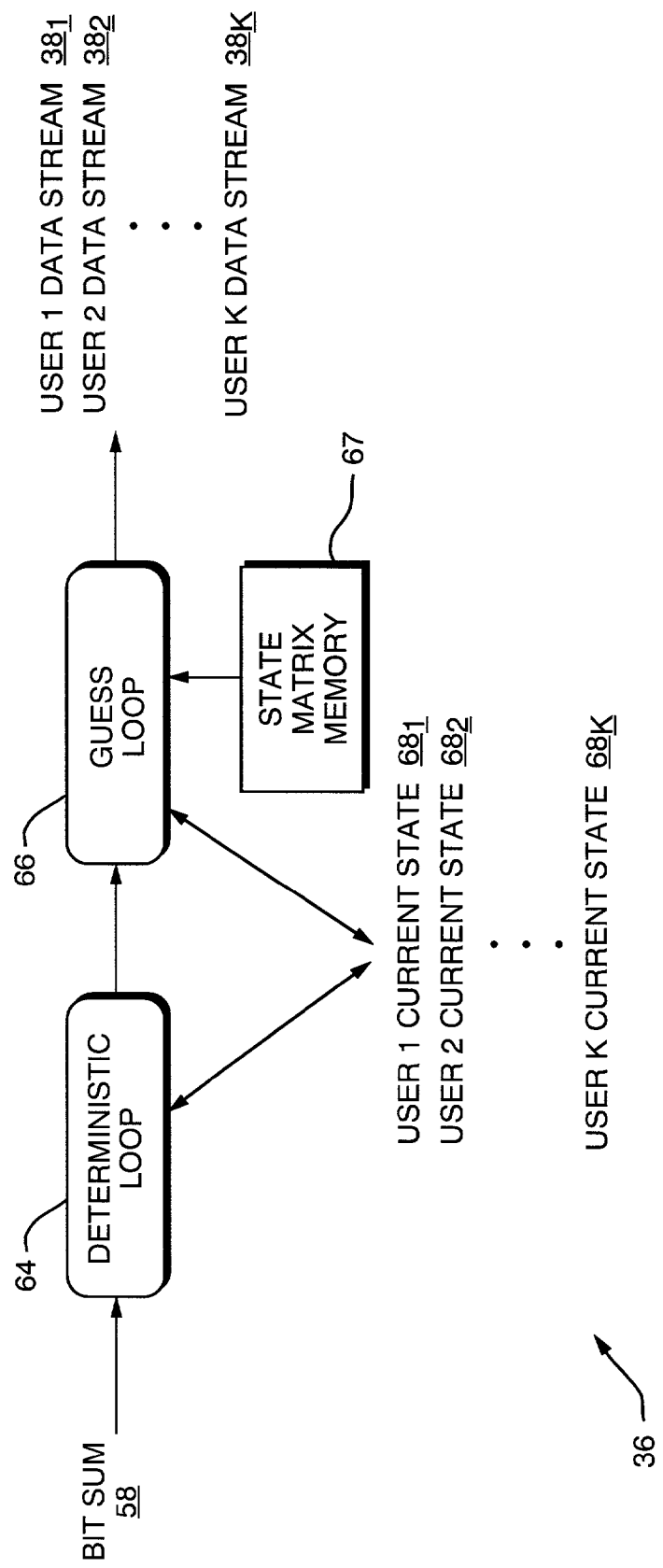
FIG. 5 is a flow chart of the Multiuser Convolutional Decoder.

Referring now to FIG. 2, FIG. 5 and FIG. 6, FIG. 5 is a flow chart of the Multiuser Convolutional Decoder 36 and FIG. 6 illustrates an example of the Multiuser Convolutional Decoder decoding a bit sum stream. The bit sum 58 data output from the Bit Sum Look-Up Table 32 is fed to the Multiuser Convolutional Decoder 36 which decodes all user data streams simultaneously using a multiuser optimal maximum likelihood estimator producing User Data Streams $38_1$ to $38_K$. The Multiuser Convolutional Decoder 34 performs a Deterministic Loop 64 and Guess Loop 66. The Multiuser Convolutional Decoder 34 performs a search to decode the bit sum stream. The system exploits the fact that convolutional encoding is a linear operation which uses a finite state machine (FSM) to describe its behavior. This behavior is defined by the generator polynomial in each of the Transmitter Systems' $12_1$ to $12_k$ Convolutional Encoders $15_1$ to $15_k$. Each Encoder $15_1$ to $15_k$ in the Transmitters $12_1$ to $12_k$ has an L-bit register to perform the encoding. The information in the last L−1 bits is known as the State of the Encoder $15_1$ to $15_k$. The L'th bit holds the new input, which is used to determine the next State of the Encoder $15_1$ to $15_k$. Based on whether this L'th bit is a '0' or '1', a specific output is defined by the generator polynomial 'g'. Thus, a matrix can be built of all possible states and their given outputs, which is called the "State Matrix".

Still referring to FIG. 5, there are two steps in the decoding of the bit sums. The first step 64 is the Deterministic Loop which uses the state machine to eliminate possibilities and check for errors in the bit sums. This loop utilizes the outer symbols of the pseudo-constellation (FIG. 4B) to perform bookkeeping on the bit sums. If the bit sum of a signal is, for example, [02] the first bit shows that all users have transmitted a '0' as the first bit. The second bit in the symbol is ambiguous and is left as undefined until the next portion of the algorithm. Accordingly, if the bit sum is [32], the first bit shows that all users have transmitted a 1 as the first bit in the symbol and the second bit is ambiguous. This Deterministic Loop 64 has linear complexity and is only run once in the decoding process.

After one Deterministic Loop at step 64, the Guess Loop at step 66 is run to perform an exhaustive search over all of the bit sums. Code-enhancement occurs in the Receiver 16 to reduce the search set during the Guess Loop 66. For each bit sum, first, a State Matrix is checked for possible outcomes for all the user's current states $68_1$ to $68_k$. If only one possible outcome for a certain user is found due to a present bit that was previously decided via the Deterministic Loop (step 64), that outcome is chosen for that user's output bits. If no bits have been previously decided, guesses are made for each user based on their possible outputs and the bit sum. After each of the user's output bits are chosen or guessed, they are checked to ensure that the sum of all the user's bits equal the bit sum. The current state information is stored for each user, as well as the chosen outcome. If there is more than one possibility of outcome to choose, a choice is arbitrarily made and the next bit sum is processed. History information regarding that symbol cycle, such as the current states of the users, is saved in case an incorrect guess is made. If a point is reached where there are no possible outcomes, an incorrect guess was made, and processing is rolled back to the last guess point, and a different guess is made. This guess information is then added to the history. For the next symbol period, the current states of the users are updated, and the next symbol is processed. The Guess Loop 64 process is continued until a decision has been made for all bit sums. At the end of Guess Loop 66 processing, the state information is parsed to reveal the decoded bit-stream.

Referring to FIG. 6A and FIG. 6B, FIG. 6A is a constellation diagram showing examples of the areas of bit clusters and the connection between the defined bit sums and the output bits for each of three users, User 1, User 2 and User 3. FIG. 6B is a constellation diagram showing all the possible symbol points in a three user constellation. The bit clusters may be estimated from this diagram and the area of each cluster may be readily calculated by one of ordinary skill in the art. Referring to FIG. 6A, the bits for each user correspond to encoded bits that will be sent to a convolutional decoder for processing. At time periods two and four, the bit sums for all users are [2,2]. This is an ambiguous case and guessing has to be done to resolve the bits in these bit sums. It is seen in the user's combination of bits, that in the [2,2] case, the users bits are not deterministic as in the case of time period seven, where there is one deterministic bit in the bit sum. In the time period seven case, it is apparent that all users have a bit value of '1' for the first half of their symbol. The second half is ambiguous and will need further processing to resolve.

Figure 7A:
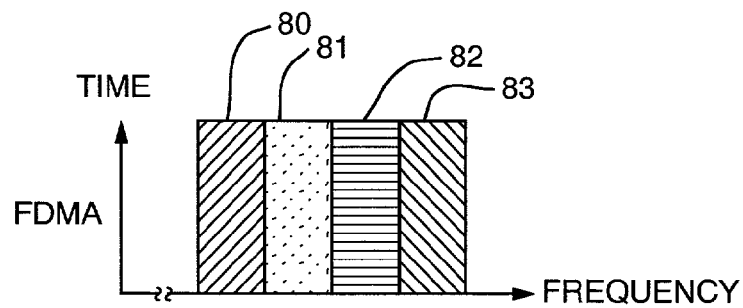
FIGS. 7A–7D shows time vs frequency diagrams for FDMA, TDMA, CDMA and Cooperative Code-Enhanced Multiuser Communications multiplexing schemes.
Figure 7B:
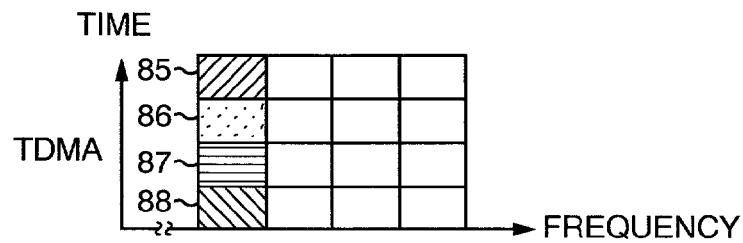
Figure 7C:
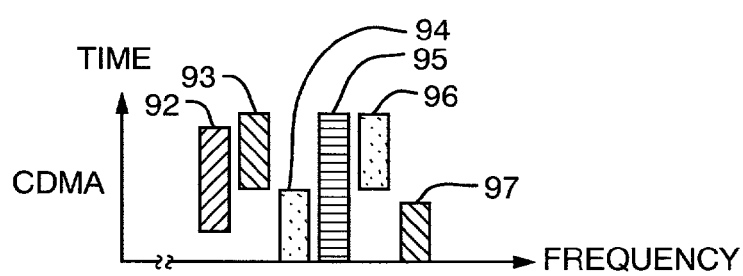

Referring to FIGS. 7A to 7D, time vs frequency diagrams are shown for Frequency Division Multiple Access (FDMA), Time Division Multiple Access (TDMA), Code Division Multiple Access (CDMA) and Cooperative Code-Enhanced (CCE) multiplexing schemes for multiuser communication systems. The FDMA scheme of FIG. 7A shows different users monopolizing separate slices 80–83 of the frequency spectrum. The TDMA scheme of FIG. 7B shows different users (A–D) monopolizing the same slice of the frequency spectrum at different time intervals 85–88. Additional users (E–P) use other slices of the frequency spectrum. The CDMA scheme of FIG. 7C shows different users utilizing varying slices 92–97 of the frequency spectrum at different time intervals (spread spectrum). However, a large portion of the frequency spectrum is needed to implement this spread spectrum scheme.

Figure 7D:
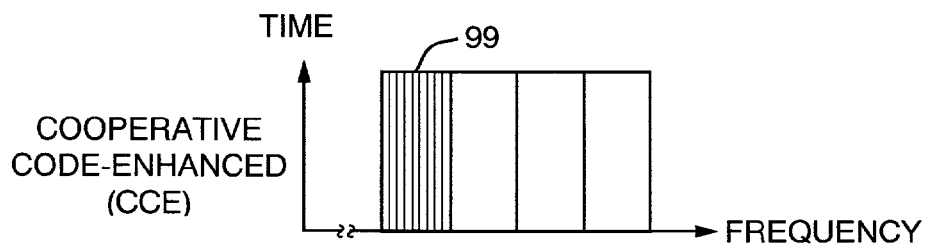

FIG. 7D shows the Cooperative Code-Enhanced (CCE) scheme of the present invention for multiuser communications where multiple users (A–D) utilizing the same slice 99 of the frequency spectrum simultaneously. As long as phase/amplitude are synchronized and signal-to-noise ratio (SNR) remain high, additional users (E–P) can be added to each slice of the frequency spectrum.

FIGS. 7A to 7D demonstrate the advantage of the CCE multiplexing scheme over multiuser communications systems using other multiplexing schemes. The other multiplexing schemes as shown in FIGS. 7A to 7C rely on different users using either different frequencies or different times. The Cooperative Code-Enhanced scheme relies on the cooperative power and timing control of the Transmitter Systems $12_1$ to $12_k$ to enhance formation of the Pseudo Constellation Clusters 44 and determining bit sums 58, which are decoded with the aid of the reduced search set provided by the code-enhancement in the Receiver 16. The CCE scheme allows multiple users to piggyback on top of one another thereby increasing the data rate possible using a given portion of the frequency spectrum. The primary advantage of the CCE scheme over CDMA is the ability to accommodate multiple users on a single channel. The CDMA spread spectrum technology requires a number of adjacent channels to provide separation for the various signals at any given time.

The CCE multiplexer scheme may be used in a satellite receiver that synchronizes power and timing via a control channel received by each user. It may also be employed in a cellular receiver (or base station) operating with mobile users. Timing control in both of these applications can be realized utilizing a GPS receiver on each user since the GPS signal incorporates timing data. Further, a cable system may use the CCE multiplexer scheme where multiple transmitting systems synchronize using local network connections prior to feeding data to a multiplexing component which combines the signals prior to transmission over a cable channel.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A receiver of a code-enhanced multiuser communications system comprising:
    a signal sampler for converting a received composite waveform signal to a digitized composite signal;
    a signal point to cluster mapper, coupled to said digitized composite signal, for calculating a closest pseudo-constellation point of said digitized composite signal and mapping said point to a specific phase and amplitude on a constellation diagram;
    a bit sum look-up table for receiving said closest pseudo-constellation point and generating a composite symbol bit sum;
    a multiuser convolutional decoder for decoding said composite symbol bit sum to generate individual user data streams;
    wherein said multiuser convolutional decoder comprises a deterministic loop for testing said bit sum, received from said bit sum lookup table, by state machine means for determining bits of said bit sum that are not ambiguous; and
    said multiuser convolution decoder comprises a guess loop for testing said bit sum after said deterministic loop test and performing guesses until all bits have been decided for each user.

2. The receiver as recited in claim 1 wherein said received composite waveform signal comprises encoded signals, each of said encoded signals being generated by a convolutional encoder using a different generator polynomial in each of said convolutional encoder.

3. The receiver as recited in claim 1 wherein said signal point to cluster mapper comprises:
    means for calculating a received signal point in response to receiving said digitized composite signal;
    a multiuser pseudo-constellation calculator having pre-stored known user data for determining a multiuser pseudo-constellation to compare to said signal point; and
    a constellation mapper, coupled to said signal point calculating means for mapping said signal point to said multiuser constellation clusters and selecting said closest pseudo-constellation point.

4. The receiver as recited in claim 3 wherein said received signal point calculating means comprises a QAM demodulator.

5. The receiver as recited in claim 3 wherein said bit sum look-up table is determined, by said pseudo-constellation calculator prior to processing, for a known number of users in accordance with said prestored known user data.

6. The receiver as recited in claim 1 wherein said receiver comprises means for determining said bit sum look-up table prior to processing of said received composite waveform signal in accordance with received known user data for each of said users in said system.

7. The receiver as recited in claim 1 wherein said composite symbol bit sum is determined by means for summing the bits of individual user symbols.

8. The receiver as recited in claim 1 wherein said received composite waveform comprises signals of multiusers operating in a same frequency band of a frequency spectrum.

9. A code-enhanced multiuser communication system comprising:
    means for transmitting at least two user channel interfering signals within a predetermined frequency band of a frequency spectrum;
    a receiver having means for receiving a composite waveform signal from said transmitting means;
    said receiver further comprises means for converting said received composite waveform signal to composite digital data;
    means, coupled to said converting means, for calculating a closest pseudo-constellation point of said digitized composite waveform signal and mapping said point to a specific phase and amplitude on a constellation diagram;
    a bit sum look-up table for receiving said closest pseudo-constellation point and generating a composite symbol bit sum;
    a multiuser convolutional decoder for decoding said composite symbol bit sum to generate individual user data streams;
    wherein said multiuser convolutional decoder comprises a deterministic loop for testing said bit sum received from said bit sum lookup table by state machine means for determining bits of said bit sum that are not ambiguous; and
    said multiuser convolutional decoder further comprises a guess loop for testing said bit sum after said deterministic loop test and performing guesses until all bits have been decided for each user.

10. The code-enhanced multiuser communication system as recited in claim 9 wherein said transmitting means for each user comprises a convolutional encoder having a different generator polynomial for each of said transmitting means.

11. The code-enhanced multiuser communication system as recited in claim 9 wherein said pseudo-constellation point calculating means comprises:
    means for calculating a received signal point in response to receiving said digitized composite signal;
    a multiuser pseudo-constellation calculator having pre-stored known user data for determining a multiuser pseudo-constellation to compare to said signal point; and
    a constellation mapper, coupled to said signal point calculating means for mapping said signal point to said multiuser constellation clusters and selecting said closest pseudo-constellation point.

12. The code-enhanced multiuser communication system as recited in claim 11 wherein said bit sum look-up table is determined by said pseudo-constellation calculator prior to processing for a known number of users in accordance with said prestored known user data.

13. The code-enhanced multiuser communication system as recited in claim 9 wherein:
    said receiver comprises means for determining said bit sum look-up table prior to processing of said received composite waveform signal in accordance with received known user data for each of said users in said system.

14. The code-enhanced multiuser communication system as recited in claim 9 wherein said receiver comprises means for providing power and timing control to form said pseudo-constellation of bit-sums.

15. The code-enhanced multiuser communication system as recited in claim 9 wherein said received composite waveform comprises signals of multiusers operating in a same frequency band of a frequency spectrum.

16. A method for providing a code-enhanced multiuser communication system comprising the steps of:
   transmitting at least two user channel interfering signals within a predetermined frequency band of a frequency spectrum with means including a convolutional encoder means having a different generator polynomial for each user;
   receiving a composite waveform signal from said transmitting means with a multiuser detector receiver;
   converting in said receiver said received composite waveform signal to composite digitized data in a signal sampler;
   calculating in said receiver a closest pseudo-constellation point of said composite digitized from said signal sampler and mapping said point to a specific phase and amplitude on a constellation diagram;
   generating in said receiver a composite symbol bit sum of said closest pseudo-constellation point in a bit sum look-up table;
   decoding said composite symbol bit sum to generate individual user data streams using a multiuser convolutional decoder;
   wherein said step of decoding said composite symbol bit sum comprises the steps of testing in a deterministic loop said composite symbol bit sum received from said bit sum look-up table by means of a state machine for determining bits of said bit sum that are not ambiguous; and
   testing in a guess loop said bit sum after said deterministic loop testing and performing guesses until all bits have been decided for each user.

17. The method as recited in claim 16 wherein said step of calculating in said receiver a closest pseudo-constellation point of said composite digital data comprises the steps of:
   calculating in a QAM demodulator a received signal point in response to receiving said composite digitized data;
   calculating in a multiuser pseudo-constellation calculator, having prestored known user data, a multiuser pseudo-constellation to compare to said signal point; and
   mapping said signal point to clusters of said multiuser constellation in a constellation mapper means and selecting said closest pseudo-constellation point.

18. The method as recited in claim 17 wherein said method further comprises the step of determining said bit sum look-up table in said multiuser pseudo-constellation calculator, prior to processing, for a known number of users in accordance with said prestored known user data.

19. The method as recited in claim 16 wherein said method comprises the step of providing power and timing control in said transmitting means to enable formation of said pseudo-constellation of bit sums.

20. The method as recited in claim 16 wherein said method provides for said received composite waveform having signals of multiusers to operate in a same frequency band of a frequency spectrum.

\* \* \* \* \*